Inventor.
JOSEPH A. KULHAVY
By
Wilson, Settle, Batchelder &
Att'ys. Craig

Oct. 1, 1968    J. A. KULHAVY    3,403,736
DRAFT CONTROL SYSTEM FOR TRACTOR-DRAWN IMPLEMENTS
Filed Feb. 14, 1966    4 Sheets-Sheet 3

Inventor:
JOSEPH A. KULHAVY
By
Wilson, Settle, Batchelder &
Craig
Attys.

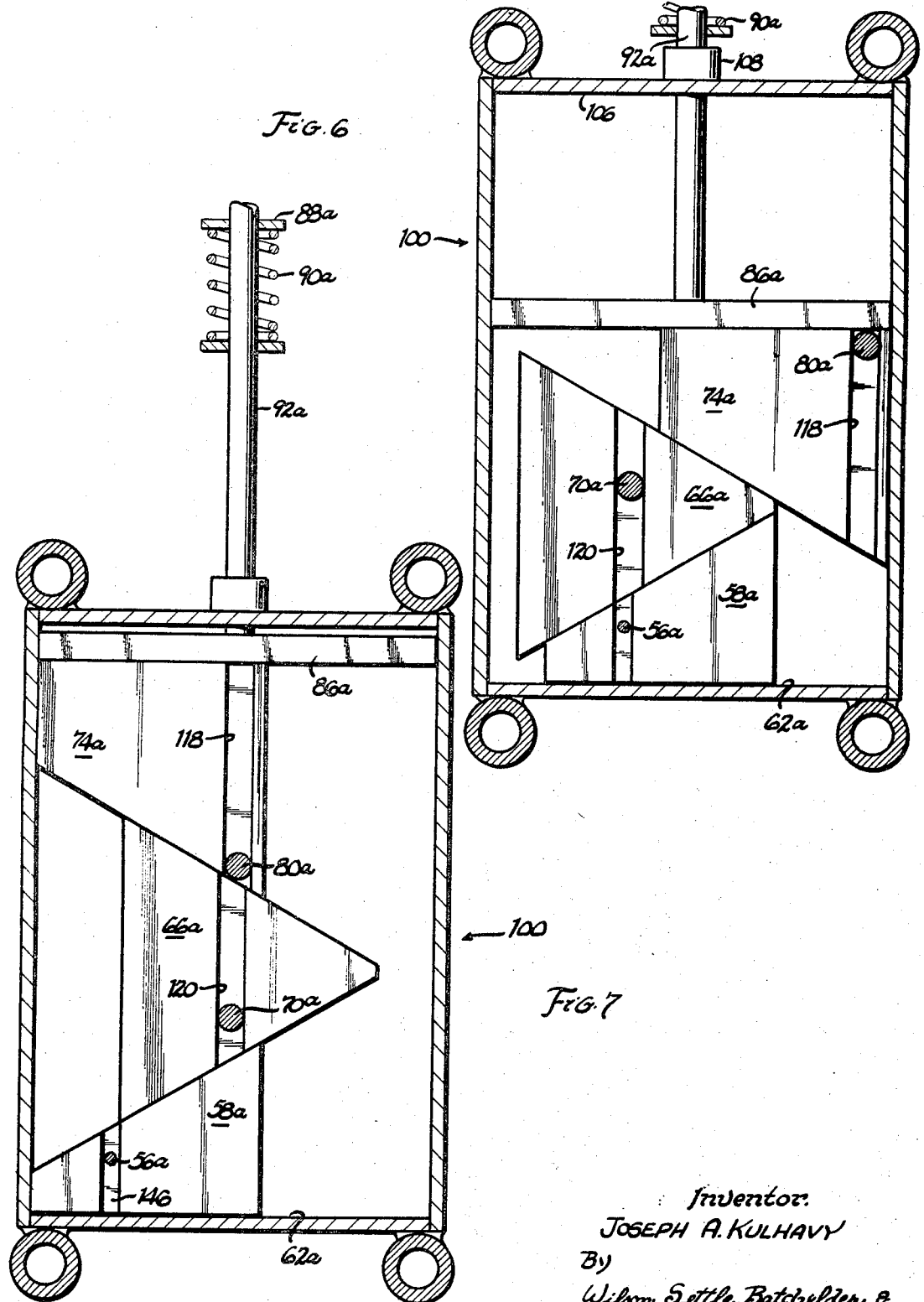

United States Patent Office 3,403,736
Patented Oct. 1, 1968

3,403,736
DRAFT CONTROL SYSTEM FOR TRACTOR-DRAWN IMPLEMENTS
Joseph A. Kulhavy, Racine, Wis., assignor to J. I. Case Company, Racine, Wis., a corporation of Wisconsin
Filed Feb. 14, 1966, Ser. No. 527,018
9 Claims. (Cl. 172—9)

ABSTRACT OF THE DISCLOSURE

This invention relates to draft control systems for tractor-drawn earth-working implements and more particularly to improvements in mechanisms for controlling hydraulically actuated implement lifting mechanisms.

---

Draft control systems of the type with which the present invention is concerned include a hydraulic lift cylinder which is coupled to the earth working implement in a suitable manner so that actuation of the cylinder raises or lowers the implement to control the depth at which the implement is operated. Actuation of the cylinder is in turn controlled by a valve which, in the normal system, is in turn positioned in response to one or more of three signals. These are: a manual signal from the operator; a signal representative of the depth or position of the implement; and a signal representative of the magnitude of draft load applied to the implement. In a full manual or so-called position control operation, the draft load signal is dispensed with and the implement is operated at a constant depth determined by the manual control, modified in some cases by the implement position signal and this constant depth is mantained regardless of the magnitude or variation of the draft load applied. In an automatic or so-called load control operation, the depth of the implement is automatically varied by the draft load signal to maintain a substantially constant draft on the implement by raising the implement in response to an increase in draft and lowering the implement in response to a decrease in draft.

In systems of this type, it is necessary to position the control valve in response to one or more of the three signals referred to above and in substantially all systems to combine or balance the various signals out at the valve.

While various forms of mechanisms for controlling the position of the hydraulic control valve for systems of the type referred to above are presently known, there is substantial room for improvement in this field. The mechanism is required to withstand fairly rugged usage while at the same time maintaining itself in adjustment to a degree sufficient to accurately position the valve spool with a fairly high degree of precision within a relatively small range of movement. Most presently available designs represent a compromise of one sort or another between the competing requirements of ruggedness, accuracy and simplified construction.

Accordingly, it is one object of the present invention to provide valve positioning mechanism of the type referred to above capable of maintaining accurate and precise positioning of the valve spool with a minimum number of relatively uncomplicated parts.

It is another object of the present invention to provide a valve positioning mechanism for a draft control system which provides a positive positioning of the valve spool.

Still another object of the invention is to provide a valve positioning mechanism for a draft control system in which the sensitivity of the positioning mechanism in load control operation may be readily varied or adjusted in the field.

The foregoing, and other objects, are achieved in a valve positioning mechanism in which a series of stacked wedges are slidably engaged with each other to vary the spacing between a pair of opposed relatively movable support elements. Sliding movement of any of the wedges relative to the others changes the spacing between the support elements and the draft control system control valve is positioned in response to the spacing between the support elements. One of the wedge elements is positioned in proportionate response to the applied draft as sensed by a draft sensing mechanism, while a second of the wedge elements is positioned in response to the implement position. The third wedge element is employed as a manual control.

The sensitivity of the system to variations in draft is accomplished by feeding the draft load signal into a rotary shaft having a crank pivotally mounted on the shaft for adjustment about an axis normal to the shaft axis. A given draft signal, in one form of the invention, causes a given rotation of the shaft. By positioning the adjustable crank at right angles to the shaft axis, a given rotation of the shaft is fully applied to the draft control wedge element. To reduce the sensitivity of the device to draft signals, the adjustable crank is pivoted to a position between the perpendicular and coaxial alignment with the shaft. By positioning the adjustable crank in coaxial alignment with the shaft axis, the system can be set for full position control operation since rotation of the shaft does not produce any output from the coaxially aligned adjustable crank.

Other objects and features of the invention will become apparent by reference to the following specification and to the drawings.

In the drawings:

FIGURE 6 is a detail cross sectional view taken approximately on line 6—6 of FIGURE 3 showing the wedge elements at one extreme position; and FIGURE 7 is a view similar to FIGURE 6, but showing the wedge elements in a different position.

Figure 1:
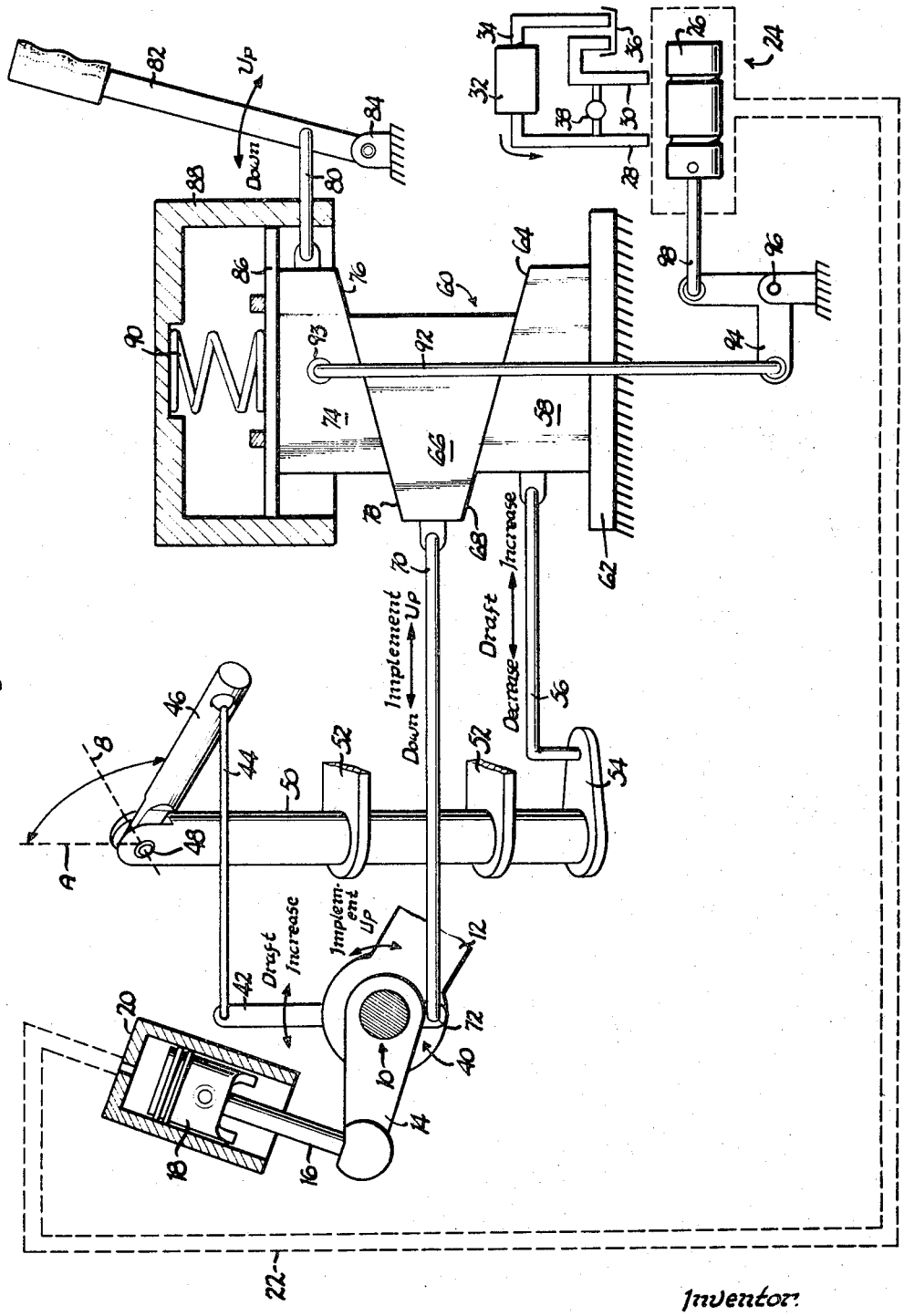
FIGURE 1 is a simplified schematic diagram of a draft control system embodying the present invention.

For simplicity in understanding the invention, reference is first made to FIGURE 1 in which there is shown schematically a rockshaft 10 mounted in the tractor frame, the rockshaft having fixedly attached thereto a pair of draft arms, one of which is partially indicated at 12, by means of which an earth-working implement such as a plow, not shown, is coupled to the tractor. Rotation of rockshaft 10 about its axis serves to raise or lower an implement coupled to draft arm 12 to regulate the working depth of the implement.

Rockshaft 10 is rotated about its axis by means of a crank arm 14 which is fixedly locked to rockshaft 10 and driven in rotation by a rod 16 coupled to the piston 18 of a hydraulic motor cylinder 20. A supply conduit 22 connects the chamber of cylinder 20 to a hydraulic control valve designated generally 24 having a reciprocable valve spool 26 operable to selectively connect conduit 22 to a high pressure line 28 or low pressure return line 30. A pump 32 is connected to supply hydraulic fluid under pressure to conduit 28, pump 32 having an intake 34 connected to a sump 36 into which low pressure conduit 30 discharges. A pressure relief valve 38 is connected between conduits 28 and 30 to relieve the pump when valve spool 26 is in a central blocking position blocking both conduits 28 and 30. Valve spool 26 is movable in either direction from the neutral of blocking position, movement of the valve spool to the right is viewed in FIGURE 1 connecting conduit 28 to conduit 22, while movement of the valve spool in the opposite direction blocks conduit 28 and connects conduit 30 to conduit 22. Hydraulic control systems of this type are well known in the art and further details are not deemed necessary.

A draft sensing mechanism is schematically shown at 40. Many types of draft sensing mechanisms are well known and the particular sensing mechanism employed in the present case may take the form of any of several well known mechanisms. However, for the purposes of the present application, the sensing mechanism 40 preferably takes the form of that shown in the co-pending application of Milton C. Bennett and Joseph A. Kulhavy, Serial No. 593,766, filed October 7, 1965, and assigned to the assignee of the present application. Sensing mechanism 40 functions to rotate an arm 42 in a clockwise direction from a neutral position generally about the axis of rockshaft 10 in response to an increase in draft and to rotate arm 42 in the opposite direction in response to a decrease in draft applied to the implement. Arm 42 is connected by a link 44 to an adjustable crank 46 pivotally connected at one end as at 48 to a shaft 50, pivotal connection 48 permitting adjustment of adjustable crank 46 about an axis perpendicular to the axis A of shaft 50. Shaft 50 is supported for rotation about its axis A as by brackets 52 fixedly mounted upon the tractor frame.

At the lower end of shaft 50 a fixed crank 54 is coupled by a link 56 to a wedge element 58 which forms a part of valve actuating mechanism designated generally 60 employed to shift valve spool 26 to control the flow of hydraulic fluid to or from motor cylinder 20. In addition to wedge element 58, mechanism 60 includes a fixed support element or platform 62 upon which wedge element 58 is supported for sliding movement from left to right as viewed in FIGURE 1. The upper surface 64 of wedge element 58 is inclined and a second wedge element 66 has a lower inclined surface 68 which is slideably supported upon surface 64 of wedge element 58. A link 70 connects wedge element 66 to a crank 72 fixedly secured to rockshaft 10. It is believed apparent that rotation of shaft 50 about axis A is transmitted by link 56 to slide wedge element 58 from left to right or vice versa upon support element 62 and that link 70 causes wedge element 66 to slide from left to right or vice versa along surface 64 upon rotation of rockshaft 10.

A third wedge element 74 is formed with an inclined lower surface 76 which is slidably supported upon upper surface 78 of wedge element 66. Wedge element 74 is coupled by a link 80 to a manually operable hand lever 82 pivotally mounted upon a fixed frame element 84.

A second support element 86 is slideably engaged with the upper surface of wedge element 74 and supported for vertical movement within a fixed housing 88. A compression spring 90 resiliently biases support element 86 downwardly upon wedge element 74, thus resiliently biasing the stacked wedges 74, 66 and 58 into contact with each other and biasing wedge element 58 against the upper surface of the opposite support element 62. Wedge element 74 is slidable from left to right or vice versa by pivoting movement of hand lever 82 transmitted to wedge element 74 via link 80.

The vertical spacing between support element 62 and 86 is dependent upon the positions of the wedge elements relative to each other. For example, should wedge element 66 be moved to the right, as by raising of the implement, while wedge elements 58 and 74 remain stationary, it is believed apparent that this movement would cause support element 86 to move downwardly under the biasing action of spring 90. If wedge elements 58 and 66 remained stationary in the position shown in FIGURE 1 and hand lever 82 was swung in a clockwise direction to draw wedge element 74 to the right, support element 86 would be forced upwardly from the FIGURE 1 position.

A link 92 is pivotally coupled at its upper end to wedge element 74 and pivotally coupled at its lower end to one arm of a bell crank 94 mounted for pivotal movement about a fixed pivot 96. The opposite arm of bell crank 94 is in turn connected to a link 98 pivotally connected at its opposite end to valve spool 26. The pivotal connection 93 between the upper end of link 92 and wedge element 74 always remains at a fixed distance from support element 86, and thus the vertical position of pivot 93 is directly representative of the spacing between support element 62 and 86.

Operation of the mechanism of FIGURE 1 is as follows: Assuming valve spool 26 to be in its neutral or blocking position with the various wedge elements 58, 66 and 74 in the positions shown, a clockwise rotation of hand lever 82 about its pivot 84 draws wedge element 74 to the right, thus elevating support element 86 and pivot 93 from the position shown in FIGURE 1. The corresponding upward movement of link 92 rotates bell crank 94 in a clockwise direction, driving valve link 98 to the right to shift spool 26 to the right. This action of valve spool 26 connects high pressure line 28 to conduit 22, thus supplying fluid under pressure to the chamber of motor 20 to extend piston rod 16 to rotate rockshaft 10 in a counterclockwise direction to raise the implement.

As the implement begins to rise, by virtue of the counterclockwise rotation of rockshaft 10, crank 72 drives link 70, and therefore wedge element 66 to the right as viewed in FIGURE 1. Rightward movement of wedge element 66 tends to reduce the spacing between support element 62 and 86, thereby tending to lower link 92 to reverse the direction of rotation of bell crank 94 to restore valve 26 to its neutral or blocking position.

To manually lower the implement, hand lever 82 is moved in a counterclockwise direction about its pivot 84, thereby shifting wedge element 74 to the left as viewed in FIGURE 1. Leftward movement of wedge elements 74 permits support element 86 to move downwardly under the bias of spring 90 and link 92 is also shifted downwardly to rotate bell crank 94 in a counterclockwise direction about its pivot 96, thereby drawing valve spool 26 to the left to place conduit 22 in communication with return line 30 of the hydraulic pump system. When communication is established between conduit 22 and return line 30, hydraulic fluid under pressure is bled from motor cylinder 20, thus permitting rockshaft 10 to rotate in a clockwise direction to lower the implement. As the implement is lowered, the clockwise rotation of rockshaft 10 draws link 70 to the left, and leftward movement of wedge element 76 elevates wedge element 74 and support element 86, simultaneously lifting link 92 to restore valve spool 26 to its neutral or blocking position.

Assuming that hand lever 82 is held stationary with the implement at a desired depth and the draft sensing mechanism set at neutral for a selected constant draft, the system shown automatically compensates for variations in draft by raising or lowering the implement in response to an increase or decrease in applied draft from the initially selected value.

Upon an increase in draft over the selected value, draft sensing mechanism 40 is actuated to swing arm 42 in a clockwise direction as viewed in FIGURE 1. This action drives link 44 to the right which in turn rotates shaft 50 about its axis in a clockwise direction as viewed from above. This rotation of shaft 50 is transmitted by link 56 to wedge element 58 and drives wedge element 58 to the right as viewed in FIGURE 1 to force wedge elements 66 and 74 and support element 86 upwardly against the action of spring 90. Link 92 is elevated, thereby rotating bell crank 94 in a clockwise direction about pivot 96 to shift valve spool 26 to the right to connect high pressure conduit 28 to motor conduit 22. This action in turn causes piston rod 16 to be extended from motor cylinder 20 to driving rockshaft 10 in counterclockwise rotation to elevate the implement. As the implement is elevated, rotation of the rockshaft is transmitted via link 70 to wedge element 66 to move wedge element 66 to the right, thereby permitting wedge element 74 to lower. Lowering of wedge element 74 is transmitted via link 92 to the bell crank to restore the valve spool to its original blocking position.

Upon the sensing of a decrease in draft, draft sensing mechanism 40 causes a proportionate rotation of arm 42 in a counterclockwise direction and a reversal of the action described above occurs.

An adjustment of the sensitivity of response of the system to variations in draft can be accomplished by selecting the position of adjustable crank 46 about its pivot 48. In FIGURE 1, crank 46 is shown in a horizontal position which represents a minimum sensitivity setting. To increase the sensitivity, crank 46 may be pivoted upwardly about its pivot 48. This action decreases the effective lever arm of crank 46, and thus a given movement of link 44 traverses a greater arc about the axis A of shaft 50. Thus, for a given displacement of link 44, a greater rotation of shaft 50 about its axis is achieved than would be the case if crank arm 46 were in a horizontal position.

Referring now to FIGURES 2 through 7 inclusive, there is disclosed in these figures one exemplary form of a valve actuating mechanism 60 embodying the features of the schematically illustrated mechanism of FIGURE 1. The structure of FIGURES 2 through 7 operates on the same principle as mechanism 60 of FIGURE 1 and with a few exceptions, discussed below, substantially all of the parts in the structure of FIGURES 2 through 7 correspond to the schematically illustrated structure of FIGURE 1. Corresponding parts have been identified by the reference numerals employed in FIGURE 1 with the subscript (*a*) to assist in relating the two structures to each other.

The structure of FIGURES 2 through 7 differs from the FIGURE 1 arrangement in that the valve actuating link 92*a* is attached directly to the upper support element 86*a*. The biasing action performed by spring 90 in the FIGURE 1 structure is, in the FIGURE 2 embodiment, obtained from a compression spring 90*a* seated against a fixed frame element 88*a* (FIGURE 7) and a washer 99 fixed on link 92*a*.

The positions of the adjustable crank 46 and fixed crank 54 on shaft 50 have been reversed from the FIGURE 1 arrangement in that the adjustable crank is coupled to wedge element 58*a* and the fixed crank is coupled to the draft sensing link 44*a*.

The valve actuating mechanism of FIGURES 2 through 7 includes a rectangular box designated generally 100 having a lower wall 62*a* which performs the function of support element 62 of the FIGURE 1 embodiment. Spaced inwardly from side wall 102 (FIGURES 3, 4 and 5) is an internal wall 104 which confines wedge elements 58*a*, 66*a* and 74*a* and upper support element 86*a* to maintain the plate-like wedge elements in stacked relationship to each other. Upper support element 86*a* is supported on the upper edge of wedge element 74*a* and a valve actuating link 92*a* is fixedly secured, as by welding, to support element 86*a*. Link 92*a* passes through the upper wall 106 of the box and is slideably guided within a bushing 108. The upper end of link 92*a* may be connected to a bell crank or other suitable linkage to actuate the valve spool 26.

Figure 2:
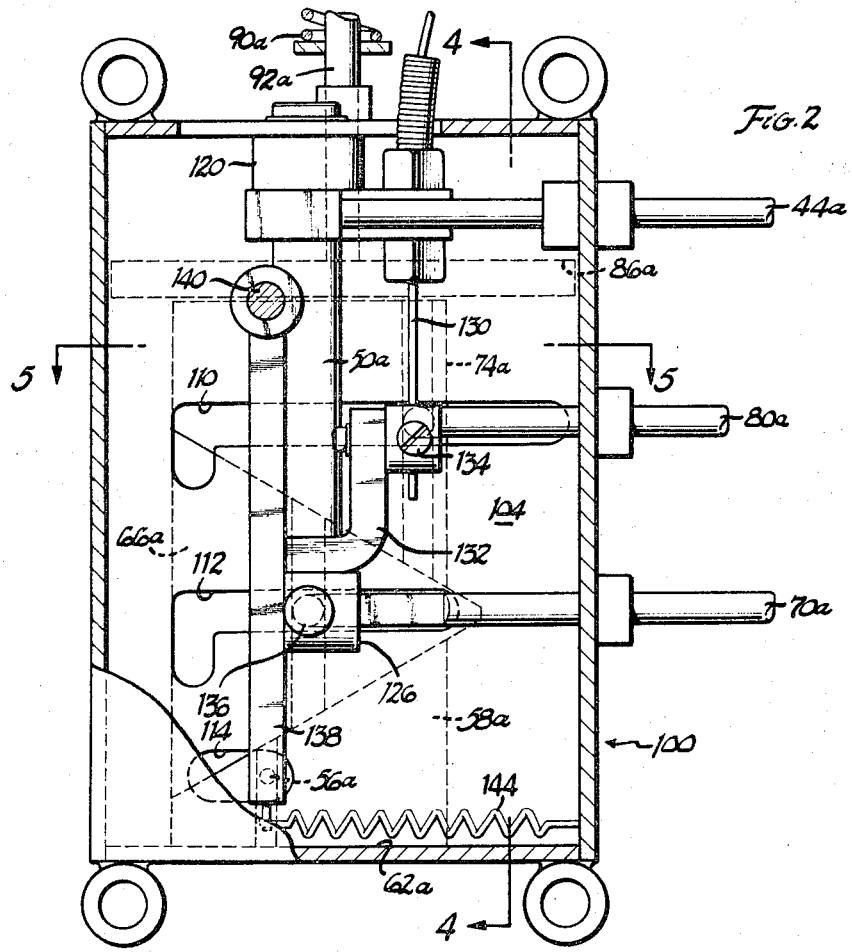
FIGURE 2 is a detail side elevation view, partially in section, with certain parts broken away or omitted, of one form of valve actuating system employed in the schematic diagram of FIGURE 1.
Figure 3:
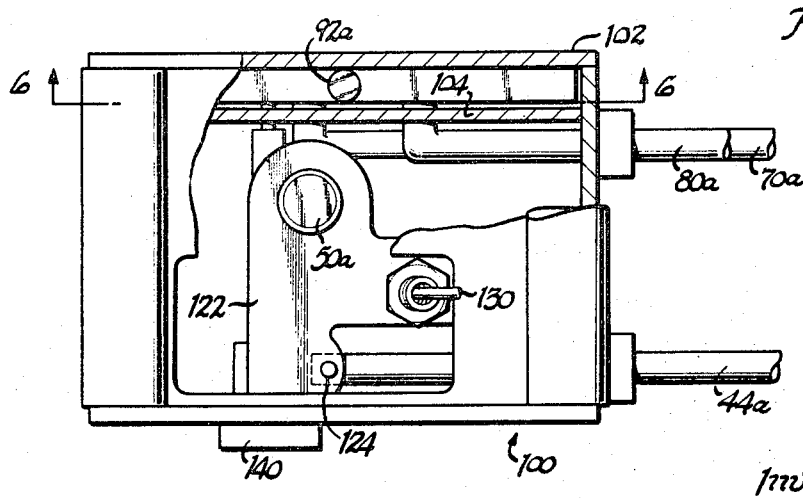
FIGURE 3 is a top plan view of the structure of FIGURE 2, with certain parts broken away, omitted or shown in section.
Figure 5:
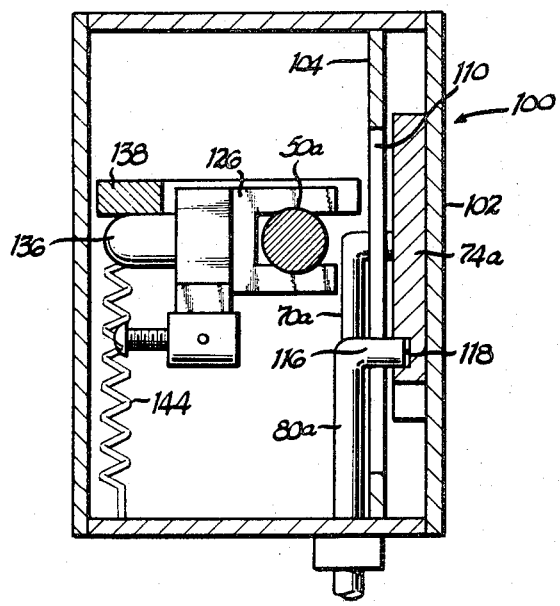
FIGURE 5 is another detail cross sectional view taken on line 5—5 of FIGURE 2.

As best seen in FIGURE 2, inner wall 104 is formed with a series of openings 110, 112 and 114 through which pass respectively links 80*a*, 70*a* and 56*a*. Referring to FIGURE 5, it is seen that the end of link 80*a* is formed with a bent portion 116 which passes through opening 110 and projects into a vertically extending groove 118 formed in the face of wedge element 74*a*. Horizontal reciprocation of the link is accommodated by the elongate opening 110 through wall 104, while vertical movement of wedge element 74*a* relative to link 80*a* is accommodated by the vertical groove 118. A similar arrangement is employed to couple link 70*a* to wedge element 66*a*. As best seen in FIGURES 6 and 7, wedge element 66*a* is formed with a vertical groove 120 to receive the end of link 70*a*.

Figure 4:
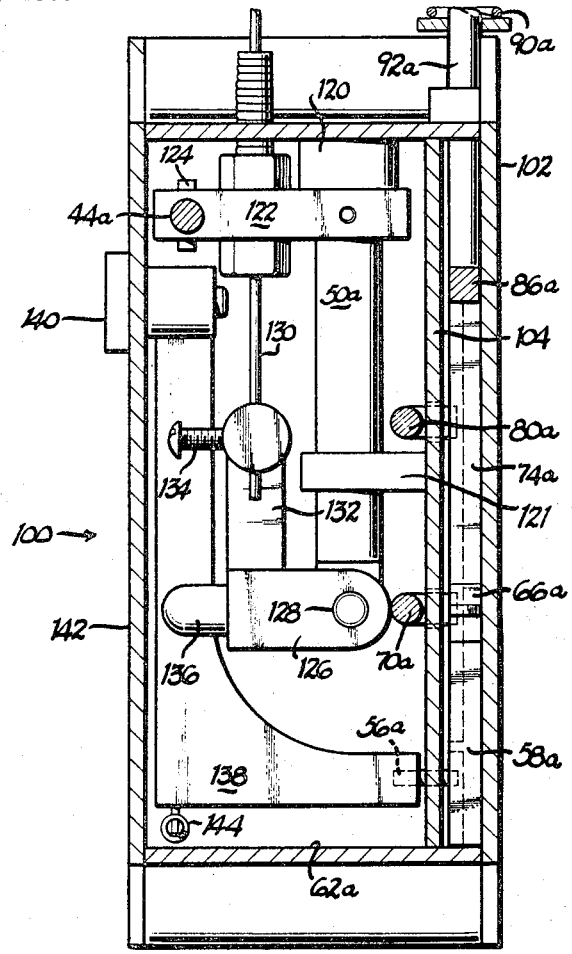
FIGURE 4 is a detail cross sectional view of a valve actuating mechanism taken on line 4—4 of FIGURE 2.

A shaft 50*a* is journalled for rotation about a vertical axis within box 100 as by a bushing assembly 120 and a lower support member 121 to perform the function of shaft 50 of the FIGURE 1 embodiment. A fixed crank 122 is fixedly secured to shaft 50*a* near its upper end and is connected as by a pivot pin 124 to the end of draft sensing link 44*a*. As best seen in FIGURE 4, an adjustable crank arm 126 is mounted upon the lower end of shaft 50*a* for pivotal movement relative to the shaft about a pivot pin connection 128 extending normal to the shaft axis.

Crank arm 126 is positioned at selected rotative positions relative to pivot pin 128 by manually actuated Bowden wire 130 clamped to a bracket 132 fixed to arm 126 as by a set screw 134. A projecting knob 136 on arm 126 bears against one side of an L-shaped arm 138 which is pivotally mounted at its upper end upon a pivot pin 140 mounted on side wall 142 of the box. Arm 138 is resiliently urged against knob 136 as by a tension spring 144 connected between the lower end of arm 138 and a wall of box 100. A wedge actuating link 56*a*, corresponding in function to the link 56 of the FIGURE 1 embodiment, is fixedly secured to the toe of L-shaped arm 138 and projects through opening 114 in wall 104 to be received within a vertical slot 146 formed in the lower wedge element 58*a*.

Wedges 58*a*, 66*a* and 74*a* function in the same manner as the corresponding wedges 58, 66 and 74 of the FIGURE 1 embodiment to raise or lower the valve actuating link 92*a* which in turn is coupled to control the valve spool 26 as in the FIGURE 1 embodiment. The primary distinction between the two embodiments is found in the sensitivity adjustment mechanism for varying the response of the valve actuating mechanism to a given draft change signal.

In the embodiment of FIGURES 2 through 7, a change in draft is applied to the mechanism by link 44*a*. Link 44*a* is connected to arm 122 which in turn is fixedly secured to the rotary shaft 50*a*. Thus, in the FIGURE 2 through 7 embodiment, the amount of rotation of shaft 50*a* is always directly proportional to the draft change signal, while in the FIGURE 1 embodiment the sensitivity adjustment varied the amount of rotation of shaft 50 in response to a given draft signal.

Assuming a rotation of shaft 50*a* in a clockwise direction as viewed in FIGURE 5, arm 126 rotates in a clockwise direction as viewed in FIGURE 5 and L-shaped arm 138 follows knob 136 extending tension spring 144. The movement of arm 138 is a pivotal movement about the axis of pivot pin 140. This action will drive wedge 58 away from the observer as viewed in FIGURE 4.

With arm 126 at the horizontal position shown in FIGURE 4, a maximum amount of movement of L-shaped arm 138 for a given draft signal occurs. This position of the arm 126 provides an automatic load control operation. To render the mechanism less sensitive to a change in draft, Bowden wire 130 is manually pushed downwardly to swing arm 126 toward alignment with the axis of shaft 50*a*. It is believed apparent that if arm 126 is moved into direct coaxial alignment with shaft 50*a*, rotation of shaft 50*a* will cause no movement whatsoever of L-shaped arm 138 and corresponds to a full manual or position control operation of the implement. At points in between the horizontal position shown in FIGURE 4, and coaxial alignment with shaft 50*a*, the amount of movement of L-shaped arm 138 for a given amount of rotation of shaft 50*a* may be varied at will.

While certain embodiments of the invention have been described in detail, it will be apparent to those skilled in the the art that the foregoing embodiments may be modified. Therefore, the foregoing description should be considered exemplary rather than limiting, and the true scope of the invention is that defined in the following claims.

I claim:
1. In a draft control system for a tractor-drawn earth-working implement or the like having hydraulic motor means actuable to raise or lower the implement, and valve means operable in a neutral position to hold said motor means stationary and operable upon displacement from said neutral position to actuate said motor means to raise or lower said implement in accordance with the direction in which said valve means is displaced from said neutral position; means for operating said valve means in response to the position of the implement and variations in draft applied thereto to cause said motor means to vary the position of the implement to maintain a substantially constant draft thereon comprising a pair of spaced opposed support elements, means mounting said support elements for relative movement toward and away from each other, spring means resiliently biasing one of said support elements toward the other of said support elements, a pair of wedge elements slideably supported between said plate elements for sliding movement relative to said plate elements and to each other in directions generally normal to the direction of movement of said plate elements relative to each other to thereby vary the spacing between said plate elements in accordance with the positions of said wedge elements relative to said plate elements and to each other, first means responsive to the position of said implement for sliding a first of said wedge elements relative to the other wedge and plate elements to locate said first wedge element at a position representative of the position of said implement, second means responsive to the draft applied to said implement for sliding the second of said wedge elements relative to the other wedge and plate elements to position said second wedge element at a position representative of the magnitude of draft applied to said implement, and third means responsive to the spacing between said support elements for locating said valve means relative to its neutral position.

2. In a draft control system as defined in claim 1; a third wedge element slideably interposed between one of said pair of wedge elements and one of said support elements, and manually operable means for slideably positioning said third wedge element relative to the other wedge and support elements.

3. In a draft control system as defined in claim 1; the further improvement wherein said second means responsive includes a first member movable in direct response to variations in applied draft, a second member coupled to said second wedge element, and adjustable means coupling said first member to said second member to impart a selected adjusted proportion of movement of said first member to said second member.

4. In a draft control system as defined in claim 3; the further improvement wherein said adjustable means comprises a shaft rotatable about a stationary axis, a fixed crank on said shaft coupled to one of said members, an adjustable crank mounted at one end on said shaft for rotative adjustment about an axis normal to the axis of said shaft, and means coupling the other end of said adjustable crank to the other of said members.

5. In a draft control system for an implement adapted to be raised and lowered on a vehicle by fluid motor means with valve means for controlling the flow of fluid to and from said motor means, a manual control member, an implement position response member and a mechanism operatively interconnecting said members and actuating said valve means in response to movement of either of said members, the improvement of said mechanism comprising at least two wedge elements having cooperating inclined surfaces and respectively connected to said control members and said position responsive member for relative sliding movement of said elements in response to movement of either of said members, and means responsive to said relative sliding movement for actuating said valve means and thereby said motor means to raise or lower the implement.

6. A draft control system as defined in claim 5, including the further improvement of a third wedge element having an inclined surface cooperating with a second inclined surface on one of said at least two wedge elements, and a draft responsive member operatively connected to said implement and said third wedge element for sliding said third wedge element with respect to said two wedge elements to actuate said valve in response to changes in draft load on said implement.

7. A draft control as defined in claim 6, including the further improvement of sensitivity adjustment mechanism incorporated in said draft responsive member for varying the amount of sliding movement of said third wedge element in response to changes in draft load on the implement.

8. A draft control system as defined in claim 5, including the further improvement of a housing enclosing said wedge elements and limiting the movement of said elements along a single plane, a plate element within said housing and engaging one of said wedge elements and biasing means acting on said plate element for maintaining said wedge elements in contacting engagement.

9. A draft control system as defined in claim 7, in which said draft responsive member includes a shaft rotatable on an axis and having one end operatively connected to said implement, the further improvement of said sensitivity adjustment mechanism comprising an arm having one end pivotally supported adjacent said shaft and an opposite end in engagement with said third wedge element and an adjustable member connected to the opposite end of said shaft for normally moving said arm in response to rotation of said shaft.

References Cited

UNITED STATES PATENTS

| 2,722,874 | 11/1955 | Bopf | 172—9 |
| 3,241,621 | 3/1966 | Bunting | 172—9 |

FOREIGN PATENTS 519,394  3/1940  Great Britain.

ABRAHAM G. STONE, *Primary Examiner.*

J. R. OAKS, *Assistant Examiner.*